UNITED STATES PATENT OFFICE.

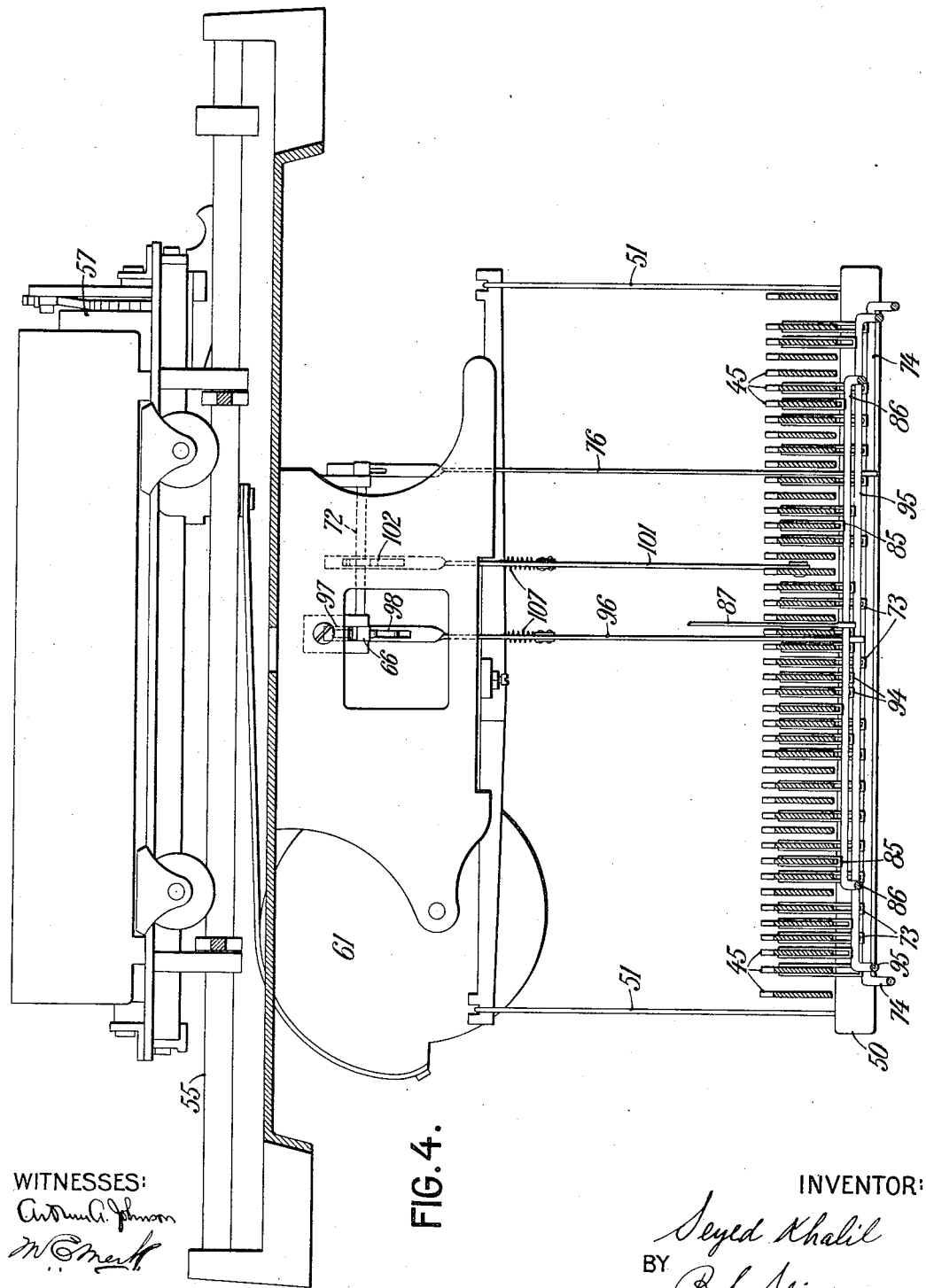

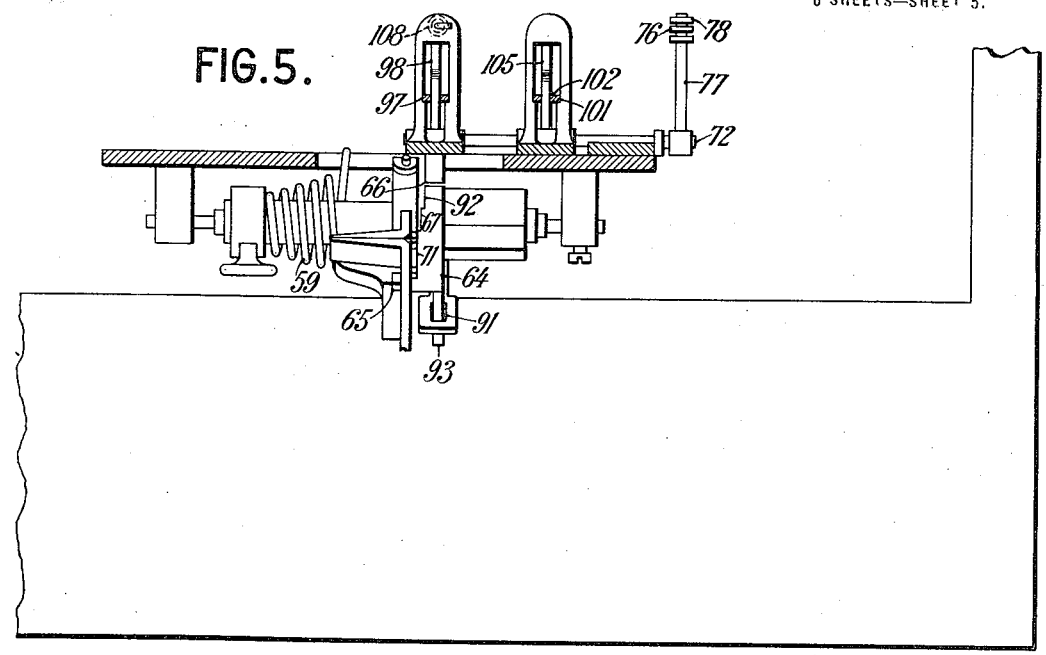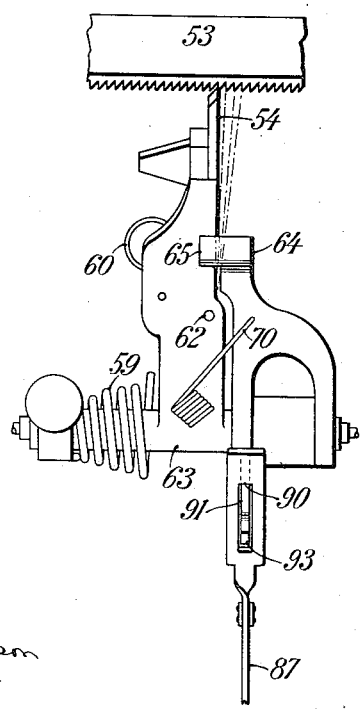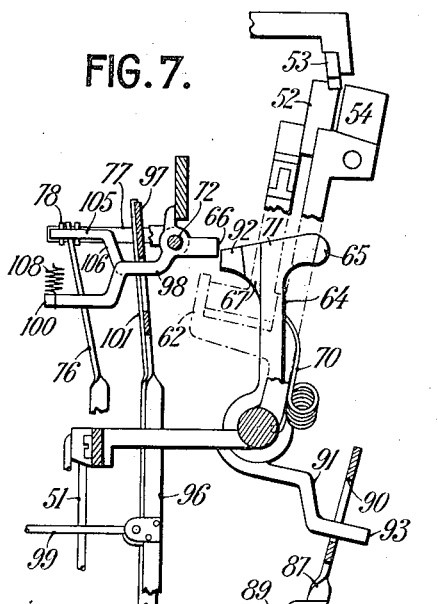

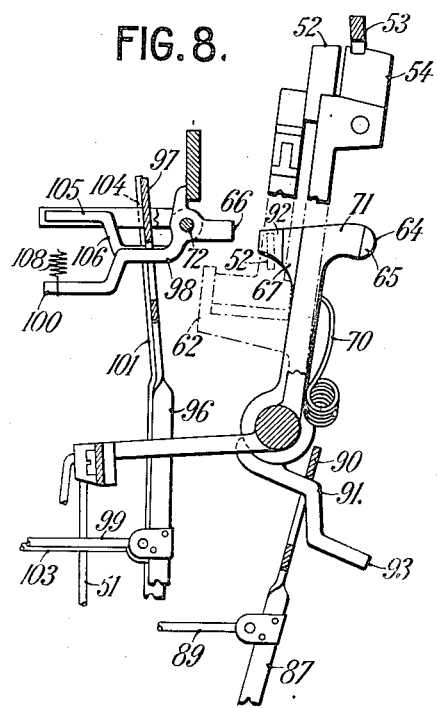
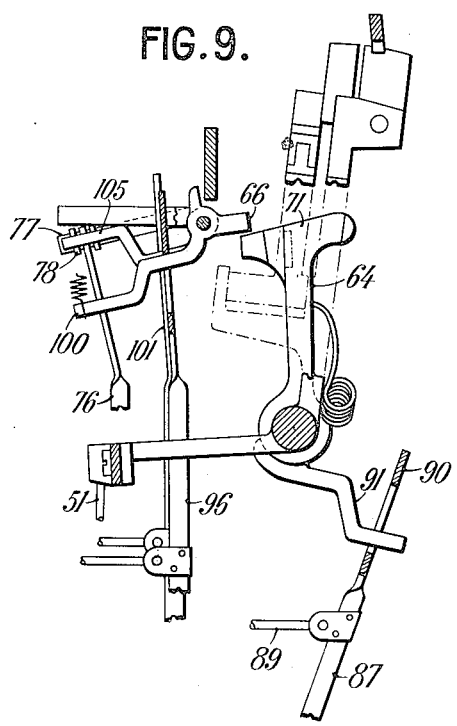
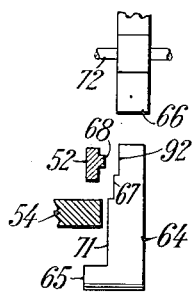
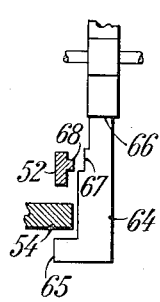
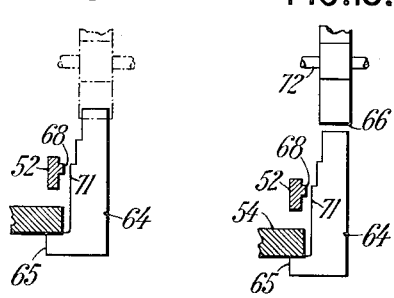

SEYED KHALIL, OF PARIS, FRANCE, ASSIGNOR TO UNDERWOOD TYPEWRITER COMPANY, OF NEW YORK, N. Y., A CORPORATION OF DELAWARE.

TYPEWRITING MACHINE.

1,403,329. Specification of Letters Patent. Patented Jan. 10, 1922.

Application filed April 14, 1917. Serial No. 162,047.

*To all whom it may concern:*

Be it known that I, SEYED KHALIL, of Paris, France, formerly of Teheran, Persia, a subject of the Shah of Persia, have invented certain new and useful Improvements in Typewriting Machines, of which the following is a specification.

My invention relates to typewriting machines adapted to write languages of the Arabic group. The languages of this group are usually written in very complex alphabets, in which the letters not only have varying forms according to their position in the word, but also certain combinations of letters are represented by single characters. It necessarily results from this that both printing types and typewriting types vary widely from ordinary script writing. The principal languages of the Arabic group, to which my invention is applicable, are Persian, Hindustani, Turkish and Arabic, although other langages may also be advantageously written according to my invention, and Arabic itself covers many forms, which may be themselves regarded as separate languages in some cases. These languages are usually written from right to left, and the terminal letter of each word usually ends with a flourish, or is very different in form from the same letters where used elsewhere, so that, by a person ignorant of the language, the terminal letter of each word may be regarded as corresponding to a capital letter of a language like English.

In addition to differing in form when in terminal position, many of the letters also differ in form, depending on whether they are intended to stand alone or to be connected with either the right-hand or the left-hand adjacent letter, or with both adjacent letters. Thus, it happens that, including terminal forms, many of the letters in languages of the Arabic group occur in four forms. Besides this, the letters of these alphabets must necessarily vary in width if their characteric shape is to be preserved, partly because the shapes of the letters depend largely on the relative length of horizontal strokes.

It has frequently been supposed to be necessary to have an equipment of types sufficient to print every form of every letter. I have found, however, if the letters or characters be of the proper width and otherwise correctly designed, each may be so formed in one of its conventional forms (such as the Naskh) that it is usually unnecessary to provide the other connecting form or forms of the letter. In other words, I have found that if I use forms of letters which are nearly perfect representations of the letters standing alone, it becomes unnecessary to provide types for writing the modified connecting forms of these letters.

Some machines have been devised with the idea of writing these languages by building up the characters, this being effected by providing types, each of which prints only part of a wide letter, and by providing types which print part of a letter without feeding the carriage; in some cases both these devices being employed in the same machine. While certain of such machines write correct Arabic, they have been based on mechanical limitations which make them inherently too slow for most business office work.

It has hitherto been assumed that in writing these languages on the typewriter, the characters printed by the same key in a shift-key machine must be of the same width in both upper and lower-case. Furthermore, owing to the fact that the great majority of letters in all these languages approximate closely to Arabic letters, it has been customary to attempt to provide types which will write all the letters in the alphabets of all these languages. These assumptions have led to the belief that certain letters of such languages must be distorted to be typewritten, or else that the wide letters must be all written by one set of keys, and the narrower letters all must be written by another set of keys. This last belief necessarily resulted in having some terminal letters in the upper-case and some in the lower, the same being also true of a few non-terminal letters.

I have found it possible to avoid all these difficulties in printing Arabic on the typewriter, because I usually print only a single well-known conventional form of each letter of one of said languages, except that where the terminal forms are very different from the medial forms, I print one terminal form. At the same time I provide that the terminal letters will be all printed in the upper-case, while the non-terminal letters will be printed in the lower-case of the corresponding keys, irrespective of their width. This latter feature makes it possible for the keyboard to be constructed with an arrangement of letters which is absolutely logical, can easily be remembered, and can easily be grouped into the most advantageous order for rapid writing. At the same time, by making each key print a full character at each stroke, I enable Arabic to be written as rapidly as English.

Thus I avoid the great handicap of placing mechanical considerations foremost in the construction of the machine, which considerations have necessarily involved the placing of letters at inconvenient positions on the keyboard. Moreover, I avoid the necessity (so demoralizing to the typist) of requiring one key to be used for printing the terminal form of certain letters, while other keys are used in printing the non-terminal forms of said letters.

Although I may confine my alphabet of types to those needed for one language, in addition to the types normally belonging to that language, I also include such types as will print such characters of other languages as are needed in transliterating words into the primary language of the typewriter. This provision of types for such transliteration is necessary because there are certain characters in some of these languages which are frequently used in writing words which are transliterated, although the alphabet proper of the language does not have that character, just as the French alphabet has no "W," but the French typewriters include the character "W" to enable transliterated words like "New York," "wagon," etc., to be written. Such types I place at the margin of the keyboard of my machine. Other little used types I also place at the margin of the keyboard of my machine, while the types commonly used in sequence are placed in such a way that the finger of one hand of the typist will fall first on one letter, and then a finger on the other hand will fall naturally on the next letter to be written. To further rapid writing on this machine, I may provide that most or all of the characters which have only one form for both terminal and non-terminal positions shall write identically in both upper and lower-case. This form of machine is especially adapted for commercial offices. Where it is desired to adapt the machine for literary work, the letters which have no separate terminal form may be placed on keys which write that letter in lower-case, and the same keys may write some special sign or character in the upper-case, according to the preference of the person using the machine.

Other features and advantages will hereinafter appear.

In the accompanying drawings,

Figure 4 is a sectional rear view of the machine shown in Figure 2.

Figure 5 is a sectional plan view of the escapement mechanism.

Figure 6 is a rear view of as much of the escapement mechanism as is closely grouped with the escapement dogs.

Figure 7 is a sectional side view of Figure 6 in its normal position.

Figure 8 is a similar view, showing the escapement mechanism about to feed the typewriter carriage three letter-spaces.

Figure 9 is a similar view, showing the escapement mechanism about to feed the typewriter carriage one letter-space.

Figure 10 is a plan view of part of Figure 8.

Figure 11 is a plan view of part of Figure 7, after the escapement feeding dogs have been partially actuated.

Figure 12 is a plan view of part of Figure 9.

Figure 13 is a plan view of part of Figure 7, with the parts in the position shown therein.

Figure 1:
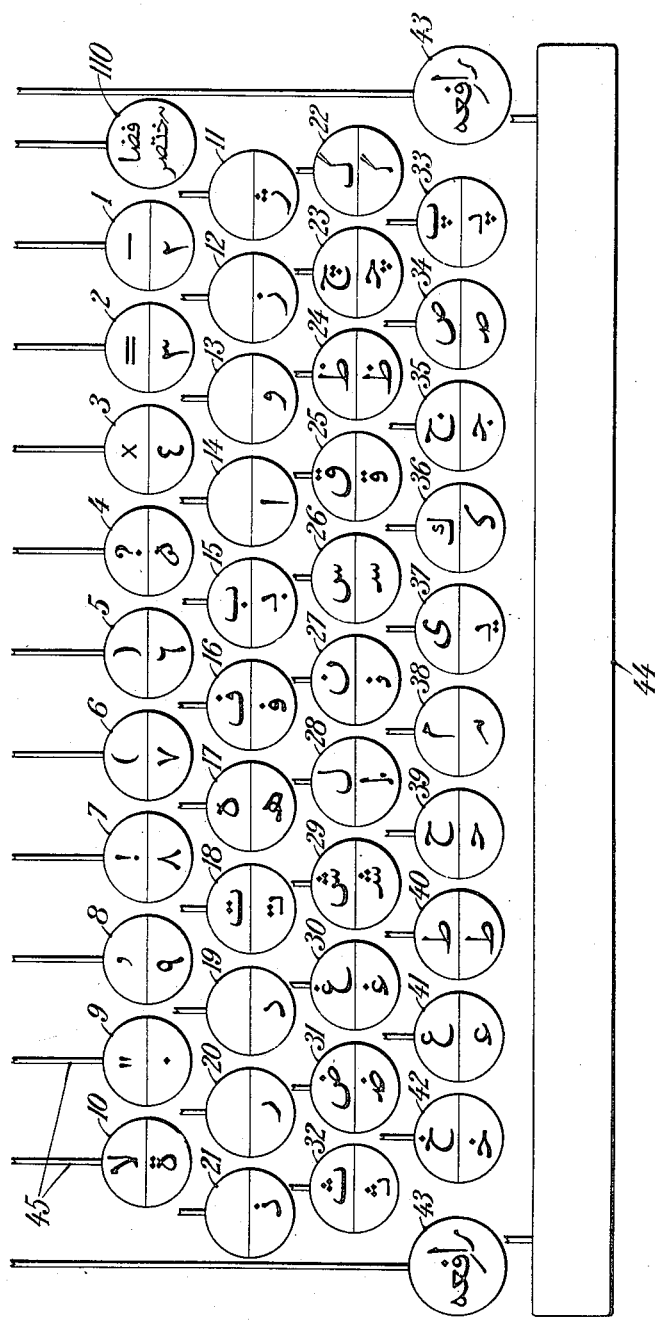
Figure 1 shows, partly diagrammatically, a form of keyboard suitable for my invention, as part of a Remington typewriting machine of the basket type having forty-two letter-feeding printing keys.

In the keyboard shown in Figure 1, the upper-case of keys 1 to 9, inclusive, is used for writing punctuation signs, such as dash, equality, the multiplication sign, etc., while the lower-case characters of the same keys write the numerals from 2 to 9, inclusive, and also the period.

The key 10 writes the character "marbaute" (a form of "te"), which is the same both in its usual and its terminal form. While this key might write said character in both its upper and lower-cases, as is done in connection with certain other keys which write characters much more used, I have found it advantageous to reduce the size of the keyboard by putting the special composite character "lam-alef" in the upper-case. I am able to do this advantageously, because the character "lam-alef" is identical both in its usual and its terminal form, and, therefore, may write identically in both upper and lower-case, if written by a key which writes no other character.

The next to the top row of the keyboard, including the keys bearing the reference numerals 11 to 21, inclusive, is preferably largely used for writing those characters which are identical in upper and lower-case. The key 11 writes the letter "je." The key 12 writes the letter "ze." Key 13 writes the letter "waw." The key 14 writes the letter "alef." Key 15 writes "be," the terminal "be" being written in the upper-case. Key 16 writes "fe," the long terminal "fe" being written in the upper-case. "He" is written by key 17, the upper-case character being different but no longer than the lower-case. "Te" (maboute) is written by key 18, the upper-case character being the terminal long form. "Dal" is written by key 19. The letter "re" is written by key 20, being the same in both the upper and lower-case. Key 21 is "zal," the same in upper and lower-case. Key 22 is "gaf," the long final form being in the upper-case. This is not strictly an Arabic letter, but is one of the letters necessary in commercial Arabic for writing transliterated words like "Pasha." The character 23 also is not a true Arabic character, but is used in writing transliterated words, being the character "Tche," of which the ordinary form is written in the lower-case and the terminal form written in the upper-case. Key 24 prints the character "za" which may either be written in the same form in both cases (as herein illustrated) or may be written in the connecting form in the lower-case and in the non-connecting form in the upper-case; this last form being always the terminal form. The character "kaf" is printed by the key 25, the small form being in the lower-case and the terminal large form being in the upper-case. The character "sin" is printed by the key 26, the enlarged terminal form being printed in the upper-case. The letter "noon" is printed by the key 27, the enlarged terminal form being printed in the upper-case. The letter "lam" is printed by the key 28, the enlarged terminal form being in upper-case. The letter "shin" is printed by the key 29, the enlarged terminal form being in the upper-case. The letter "gain" is printed by the key 30, the enlarged terminal form being in the upper-case. The character "zod" is printed by the key 31, the enlarged terminal form being in the upper-case. The character "ce" is printed by the key 32, the enlarged terminal form being in the upper-case. The letter "pe," which is a Turkish and Persian letter used in transliterated words, is printed by the key 33, the enlarged terminal form being in the upper-case. The letter "sad" is printed by the key 34, the enlarged terminal form being in the upper-case. The letter "djin" is printed by the key 35, the enlarged terminal form being in the upper-case. The character "kaf" is printed by the key 36, the ordinary form being printed in the lower-case; the terminal in the upper-case. The character "ye" is printed by the key 37. In this machine, owing to the attractive spacing of the letters, it is necessary to print only the two forms shown in upper and lower-case of said key 37, these taking the place of the ordinary forms. The letter "mim" is printed by the key 38. In this letter the ordinary form is long horizontally, while the terminal form is long vertically. The letter "ha" is printed by the key 39, the enlarged terminal form being printed in the upper-case. The letter "ta" is printed by the key 40; since this character differs from the character 24 only by a dot, all the remarks relative to one apply to the other. The character "ain" is printed by the key 41, the enlarged terminal form being shown in the upper-case. The character "khe" is printed by the key 42, the enlarged terminal form being in the upper-case. Although this character, like the letter "ha," has four forms in some forms of writing, I have found it possible, owing to the width or spacing of the letters, to write this character satisfactorily by only the two forms shown herein. The shift key 43 is shown in its usual form at either side of the keyboard with an appropriate marking, and a space bar 44 is shown at the bottom, at the front of the frame which it operates.

The numerals and the punctuation marks, which occupy the first nine keys of my keyboard, are all of single width, both in upper and lower-case. The key 10 prints double-width characters both in upper and lower-case. Of the second bank of keys, the keys 11, 12, 13, 14, 19, 20 and 21 all print single-width characters in both upper and lower-case. The keys 15, 16 and 18 print single-width characters in lower-case and double-width in upper-case, while the reverse is true of key 17. In the third bank of keys, the lower-case print single-width characters and the upper-case double-width by the keys 22, 27, 28 and 32. Double-width characters are printed in both upper and lower-case by keys 23, 24, 25 and 30. Double-width characters are printed in lower-case and triple-width in upper-case by keys 26, 29 and 31. In the lowest bank of keys, single-width characters are printed in lower-case and double-width in upper-case by keys 33, 36 and 37. Double-width characters are printed in both upper and lower-case by keys 35, 38, 39, 40, 41 and 42. Double-width characters are printed in lower-case and triple-width in upper-case by key 34.

In order to enable rapid writing to be done on the machine, the most commonly used characters are placed near the center of the keyboard, these being the characters 13, 14, 17, 27, 28, 37 and 38. While the above-named characters are the most commonly used, there are certain characters, one of which is used in almost every Arabic, Persian or Turkish word, these being the characters 15, 18, 19, 27, 28 and 38; it being noted that these characters include some and not all of those named in the previous list.

The second list, therefore, is also comprised in the characters near the center of the keyboard.

To go further into detail, it may be remarked that every Arabic, Persian and Turkish word contains one of the characters 15, 16, 20, 24, 27, 28, 31, 34, 38 and 40. A further consideration in making up my keyboard grows out of the fact that there are certain characters which never come in sequence; thus the character 34 never follows itself, and for this reason said character is placed on the lower line of keys, where it is easy to make a single key-stroke, but is not quite so easy to make a double key-stroke as it is in the central banks of keys. The character 17 never follows the character 41, so advantage is taken of this fact to place these characters on the same side of the keyboard with the result that the typist will be less likely to need to strike two adjacent keys in sequence with the same hand, and so will in general first make one key-stroke with one hand and then the other key-stroke with the other hand. The character 34 never follows the character 36, and these two characters are placed on the same side of the keyboard, for the same reason as are the characters 17 and 41. The character 30 never follows the character 41, so these two characters are placed on the same side of the keyboard for the same reason. The character 30 never follows the character 39, so these characters are placed adjacent each other. The characters 18 and 40 are never juxtaposed, so these keys are placed on the same side of the keyboard. The characters 29 and 31 are never juxtaposed, so these characters are placed on the same side of the keyboard. The characters 25 and 35 are never juxtaposed, so these characters are placed on the same side of the keyboard. The characters 35 and 36 are never juxtaposed, so these characters are placed on the same side of the keyboard.

Not only are the above groupings of characters true, but there are also other characters of which similar groups are substantially true. My keyboard, therefore, comprises an Arabic alphabet, of which the most used characters are grouped in the center. The characters likely to be doubled are put in the central bank of keys and the characters likely to be used in sequence are placed on opposite sides of the center of the keyboard, so that the hands of the typist will naturally write first with a finger of one hand and then with a finger of the other hand, so that all these facts conduce to speed. The letters used only in transliteration are placed at the margin, and the two letters very seldom used, forming the upper and lower-case characters 10, are also placed at the margin of the keyboard.

In the above, I have described many of the letters as being printed one, two or three letter-spaces wide. It will be noted, however, that all the triple space characters are terminal characters, that is to say, they are printed only as the terminal letters of words; thus, while it is convenient to cause the printing of said terminal triple space characters to also feed the carriage a triple space at the same time, such triple space feeding is not necessary, owing to the fact that every time a triple space character is printed, the space key 44 is depressed to immediately thereafter feed the typewriter carriage along, thus spacing the terminal letter just printed from the initial letter of the succeeding word. Since the space key is preferably adapted to feed the typewriter carriage a double space whenever depressed, the depression of the space key will always separate even a triple space letter from the initial letter of the succeeding word. Thus, it comes about that while my alphabet described above is described below as printed by a machine adapted to feed one, two or three letter-spaces at each printing, this disclosure is merely made to enable those who wish to write most preferred and attractive Arabic to realize fully how this may be done.

It will be realized, however, from what has just been said, that my alphabet is well adapted to be printed on a machine having a variable escapement of which the escapement may feed only one or two letter-spaces at each printing.

The machine herein shown has the keys 1 to 42 inclusive, mounted on the front ends of key levers 45 which are pivoted in the usual manner at 46 at the rear of the machine, and are connected by the usual linkages 47 to type-bars 48, on which bars are mounted the upper and lower-case printing types 49, corresponding to the alphabet shown in Figure 1. When a key writing two letter-spaces (like the key 23) is depressed, it carries its key lever 45 against the usual universal bar 50, causing the universal bar to draw down the links 51, thereby rocking the loose dog 52 which normally holds the escapement rack 53, so that said dog will be carried forwardly, clear of said rack; then the fixed dog 54 will engage the rack 53 and hold the typewriter carriage. The rack 53 forms part of the usual carriage which travels on rails 55 and 56, and includes a revoluble platen 57 and paper-guiding devices 58.

During the depression of the key, no feeding of the typewriter carriage takes place, but on the upstroke of the key the universal bar 50 rises under the tension of the spring 59, and the loose dog 52, which in the meantime has been drawn to the left by a spring 60, re-engages the rack 53 at two teeth to the left of the tooth previously engaged. This permits the typewriter carriage to be drawn to the right two letter-spaces by a spring barrel 61,—feeding to the right, owing to the fact that these languages are written from right to left. To permit this feeding to take place, the loose dog 52 is pivoted at 62 upon the fixed dog 54, said dog 54 forming part of a rock frame 63 also including a stop-piece 64, which, at this time, limits the throw of the loose dog to two letter-spaces.

The stop-piece 64 is pivoted on the rocking frame 63 and comprises a lug 65, which normally lies against the rear side of the holding dog 54; thus, when the rocking frame 63 moves forward, the stop-piece 64 moves with it until it is arrested by a lug 66, which, in arresting the stop-piece 64, holds it at such a position that a cut-out portion 67 thereon is directly opposite a lug 68 on the opposing face of the loose dog 52, said cut-out portion being of just such a depth that it permits the loose dog 52 to be thrown the two teeth spaces of the rack bar 53, described above. On the return of the rocking frame 63, under the pressure of its spring 59, the spring 70 swings the stop-piece back to its normal position with its lug 65 lying against the fixed dog 54.

In order to provide means for feeding the typewriter carriage a single letter-space instead of the two letter-spaces just described, the depression of certain keys, for example the keys 1 to 9, inclusive, may shift the arresting lug 66 to ineffective position, thus permitting the stop-piece 64 to travel forward as a unit with the fixed dog 54, during the downstroke of these typewriter keys. When the stop-piece 64 thus travels forward with the fixed dog 54, it holds a projecting portion 71 opposite the lug 68 of the feeding dog, said projecting portion 71 permitting the loose dog 52 to be drawn by its spring only enough to feed the typewriter carriage along one tooth of the rack 53.

To effect this shifting of the arresting lug 66, the lug is fast on a rock shaft 72, and this rock shaft is adapted to be rocked and carries the arresting lug 66 into ineffective position whenever any of the keys 11, 12, 13, 14, 19, 20 or 21 is depressed. To effect this rocking of the rock shaft 72, each of said latter keys is provided with a depending projection 73 fast to its key lever, in such a position that the depression of the key will cause a special universal bar 74, pivoted at the rear of the machine at 75, to draw down its link 76, said link being connected at its upper end to a rock arm 77 fast on the rock shaft 72, with the result that, when any one of said keys is depressed, it not only rocks the usual universal bar 50, which is common to all the printing keys, but before striking said universal bar 50 this key lever depresses the special universal bar 74, thus lifting the arresting lug 66 to ineffective position before the rocking frame 63 frees the loose dog 52 from the rack 53. This, therefore, permits the loose dog 52 to feed the typewriter carriage along a single letter-space, because the arresting member 64, which is normally in the position seen in Figure 13, travels forward with the rocking frame 63 to the position shown in Figure 12, as the loose dog 52 is released from the rack bar 53. A simple connection for the link 76 is shown in Figure 5, wherein the link 76 is shown embracing the rock arm 77 between two fixed collars 78 thereon.

Since some of the printing keys print characters of a different width in lower-case from what they print in upper-case, the arresting lug 66 is provided with connections which put said lug under the control of a platen-shift mechanism.

To effect a case-shift in the present machine, the revoluble platen 57 is shiftable in the main framework 79 of the typewriter carriage, the shifting being effected by the usual platen shift keys 43 which are connected by links 80 to rock a rail 81 pivotally mounted at 82, with the result that the shifting of the rail 81 rearwardly will cause the types 49 to print in upper-case. The connections between the rail 81 and the means for shifting the platen include a plate 83 to which is fast two lugs 84, one lying on each side of the rail 81, with the result that, when the rail 81 is shifted rearwardly, the upper-case characters on the types 49 print on the platen 57. The rocking of the rail 81, as above described, to shift to upper-case, is adapted to cause keys like the key 31, which prints double width in lower-case, to print triple width in upper-case. To do this the key 31 and others, which print triple width in upper-case, are provided with lugs 85 which are adapted to operate a special universal bar 86 pivoted at 75, said universal bar being connected to a link 87, which normally vibrates idly with the universal bar 86.

Figure 2:
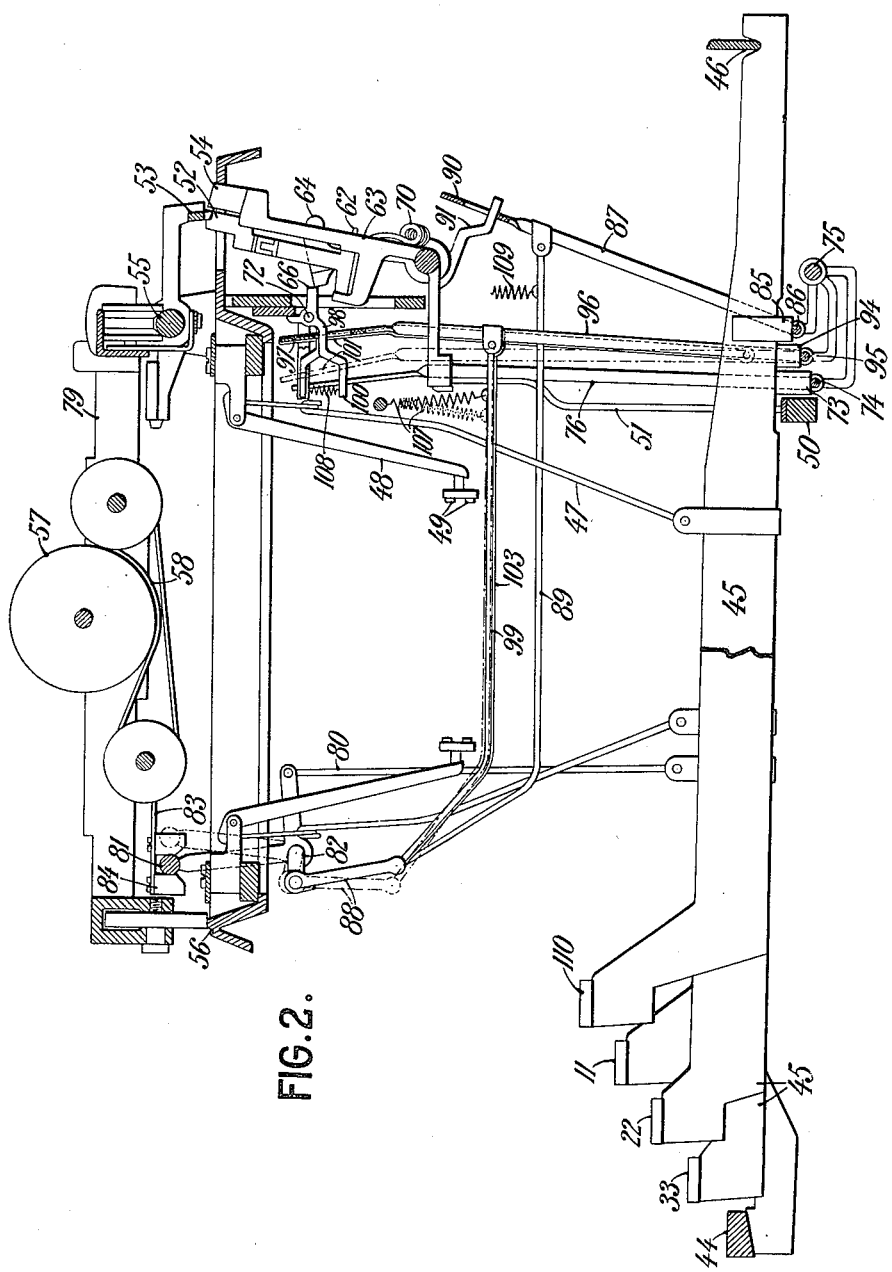
Figure 2 is a sectional side view of a Remington basket-type typewriting machine, showing one specific form of printing connections suitable for printing the characters shown in Figure 1.
Figure 3:
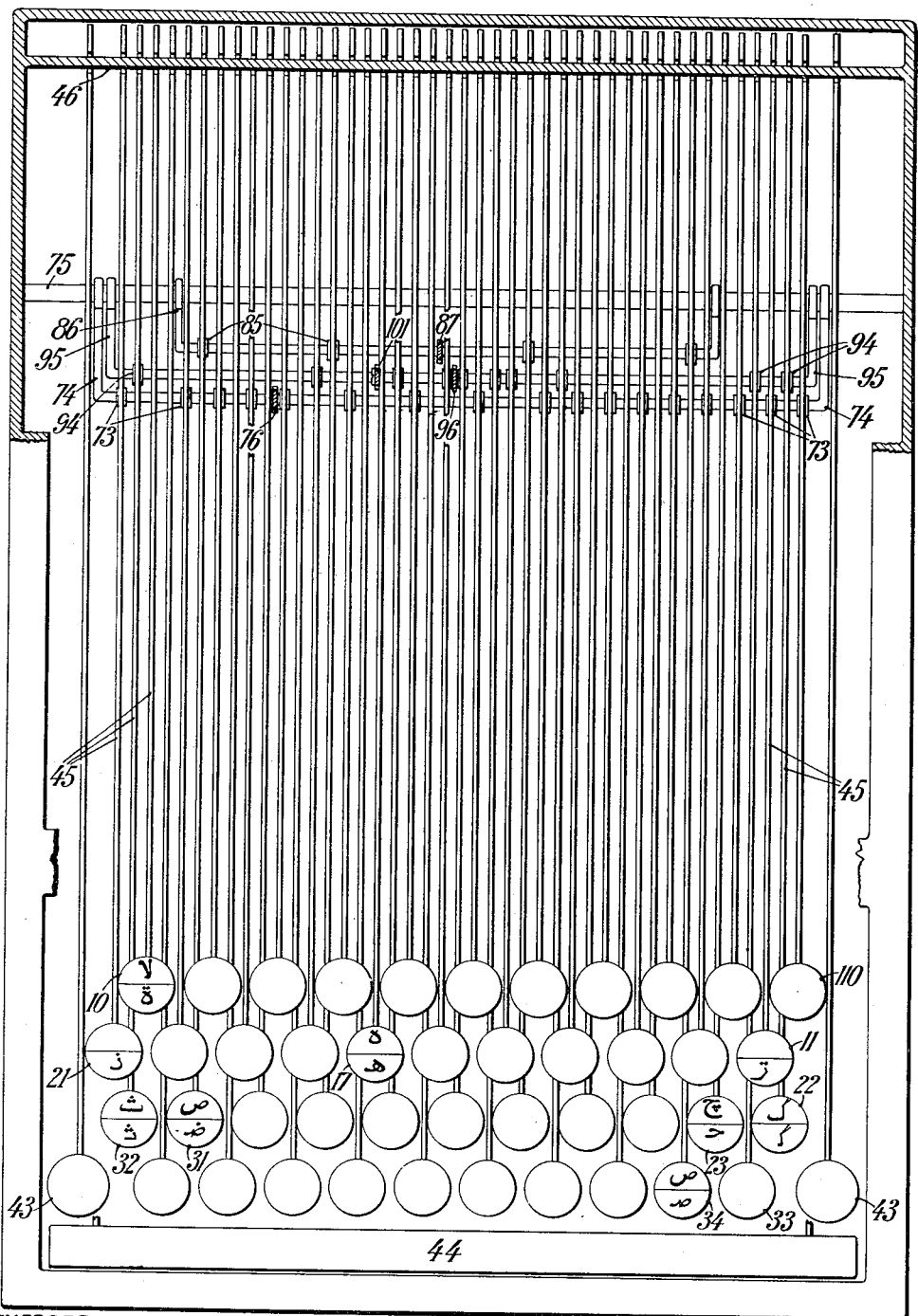
Figure 3 is a plan view of the key levers shown in Figure 2.

When, however, the shift key 43 is depressed to rock the rail 81, a rock arm 88 fast to the rail 81 and projecting downwardly from the pivot 82 thereof, draws forward a horizontal link 89 to swing the link 87 from its normal idle position, seen in Figure 2, to the effective position, seen in Figure 8, in which position an upper crossbar 90 on said link 87 overlies a rearward projection 91 fast to the stop member 64, with the result that when the link 87 is drawn downward by the depression of its universal bar 86 at the actuation of the key 31, for example, the stop member 64 is rocked so far rearward that a second cutaway portion 92 thereon comes opposite the lug 68 of the loose dog 52, with the result that when the loose dog is released, said dog jumps to the right to the position of the extreme right-hand dotted line seen in Figure 6, so that on the upstroke of the key depressed at the moment, said dog will feed the typewriter carriage along three teeth of the rack bar 53, that is to say, three letter-spaces.

In order to hold the link 87 in position, it is slotted as seen in Figure 6, so that it always embraces either the downward extension 91 of the stop-piece 64 or else an idle extension 93 thereof, thus preventing the link 87 from ever becoming disengaged from the downward extension 91. Since there are some keys, such as the key 22, which print a single width character in the lower-case and a double width character in the upper-case, a connection may be provided for causing a corresponding feeding of the typewriter carriage. To enable such a connection to be effective, these keys are provided with projections 94 which operate a special universal bar 95, and this universal bar is pivotally connected to a link 96, said link including a cross-piece 97 at its upper end, which, when writing in lower-case, overlies a rock arm 98 fast on the rock shaft 72, so that in the normal operation of writing in the lower-case, the rock shaft will swing the arresting lug 66 to ineffective position, thus causing the loose dog 52 to feed the typewriter carriage only a single space. The link 96 is adapted to be shifted to ineffective position whenever a shift key 43 is depressed, and, for this purpose, is provided with a forwardly-extending link 99 which is connected to the rock arm 88 of the case-shift mechanism, with the result that depression of the shift key draws the link 99 forward, thus carrying the cross-bar of the link 96 clear of any part of the rock arm 98 which the link is able to actuate; but allowing the link 96 still to engage an extension 100 of said rock arm, which serves to keep the link in position, so that it cannot become disengaged from the rock arm 98 while the shift key is depressed.

In order to provide that the key 17 may feed properly, said key being adapted to print a double width character in the lower-case and a single width in the upper-case, there is provided a special link 101 which is normally ineffective on the rock shaft 72 but rides idly up and down on a rock arm 105 on said shaft, because it engages it by a slot 102, Figure 5. When a shift key, however, is depressed and the rail 81 is rocked, a forwardly-extending link 103 draws said link 101 into the dotted-line position seen in Figure 2, in which position the top of a cross-bar 104 of said link overlies and engages the forwardly-extending rock arm 105 fast on the rock shaft 72, with the result that the depression of the type key 17 causes the link 101 to shift the arresting lug 66 to ineffective position. Thus, the type key, by its depression, will now permit the loose dog 52 to feed the typewriter carriage only a single letter-space. The rock arm 105, as is most clearly shown in Figure 8, is formed with a U-shaped portion 106 adjacent the rock shaft 72, so that the link 101 will always embrace the rock arm 105, but will be ineffective thereon until moved toward the outer end of said arm.

In order to hold the special universal bars 74, 95 and 86 in their normal elevated positions the links by which they are connected to the platen shift are provided with springs 107 which hold them up unless depressed by actuation of their respective actuating keys. The arresting lug 66 is also normally held in position by a spring shown at 108. The special universal bar 86 is supported by a spring 109 which may draw on the link 89.

In order to be able to position the typewriter carriage at any desired letter-space, there is provided not only the space bar 44, which is adapted to feed the typewriter carriage two letter-spaces at each depression, but also a separate space key 110, which is adapted to feed the typewriter carriage along a single letter-space, and thus position the typewriter carriage, for any desired purpose, at points where the space bar 44 might fail to feed forward to the proper space.

Variations may be resorted to within the scope of the invention, and portions of the improvements may be used without others.

Having thus described my invention, I claim:

1. In a typewriting machine, the combination with an Arabic keyboard including keys for the letter "za," the letter "sin," the letter "shin," the letter "zod," the letter "sad," the letter "ye," the letter "ha," the letter "ta," the letter "khe," a plurality of said letters having their various forms represented by only two forms, viz., a single terminal form and a single non-terminal form, keys for a plurality of other Arabic letters also being included in said keyboard, so that it represents substantially all the commonly-used letters and characters for writing the words of an Arabic language, of type-heads for printing the characters, such that most of the alphabet type-heads print a terminal and a non-terminal form of a letter from the same type-head, means connecting each of said keys to its type-head to cause it to print at the key-actuation, a carriage for the typewriter, an escapement for the carriage constructed to feed it a wide or a narrow step at any operation thereof, a case-shifting mechanism to enable either character on a type-head to be effective to print, and connections from the case-shift mechanism and keys to the escapement whereby, at the operation of any type-head by its key, the carriage is fed a wide or a narrow step, according to the width of the character to be printed.

2. In a typewriting machine having a case-shift mechanism, the combination with an Arabic keyboard including keys for the letter "za," the letter "sin," the letter "shin," the letter "zod," the letter "sad," the letter "ye," the letter "ha," the letter "ta," the letter "khe," a plurality of said letters having their various forms represented by only two forms, viz., a single terminal form and a single non-terminal form, keys for a plurality of other Arabic letters also being included in said keyboard, so that it represents substantially all the commonly-used letters and characters for writing the words of an Arabic language, of type-heads for printing the characters, such that most of the alphabet type-heads print a terminal and a non-terminal form of a letter from the same type-head, and other type-heads print identical characters in two positions of the case-shift mechanism, means connecting each of said keys to its type-head to cause it to print at the key actuation, a carriage for the typewriter, an escapement for the carriage constructed to feed it a wide or a narrow step at any operation thereof, said case-shift mechanism adapted to enable either character on a type-head to be effective to print, and connections from the case-shift mechanism and keys to the escapement whereby, at the operation of any type-head by its key, the carriage is fed a wide or a narrow step, according to the width of the character to be printed.

3. A typewriting machine adapted to write a cursive Arabic language comprising in combination, a carriage, a case-shift mechanism, an escapement adapted to feed the carriage to the right either a narrow or a wider step at any operation thereof, a plurality of type bars each having a lower-case narrow character and also an upper-case narrow character, a plurality of type bars each having a lower-case wide character and an upper-case still wider character, both characters on any type bar representing the same letter, a single key opererating each type bar, the keys corresponding substantially in position to those of the standard key-board for writing English and arranged with the keys to print the narrow characters more generally in the upper part of the key-board and those to print the wider characters more generally in the lower part of the key-board, and connections from the case-shift mechanism and the type keys to the escapement to vary the feed of the the carriage whereby at the operation of each type bar by its key the carriage is automatically fed a narrow or a wider step according to the width of the lower-case or upper-case type operated by the key.

4. In a typewriting machine, the combination with an Arabic keyboard including keys for the letter "za", the letter "sin", the letter "shin", the letter "zod", the letter "sad", the letter "ye", the letter "ha", the letter "ta", the letter "khe", a plurality of said letters having their various forms represented by only two forms, viz., a single terminal form and a single non-terminal form, keys for a plurality of other Arabic letters also being included in said keyboard, so that it represents substantially all the commonly-used letters and characters for writing the words of an Arabic language, of type-heads for printing the characters, such that most of the alphabet type-heads print a terminal and a non-terminal form of a letter from the same type-head, means connecting each of said keys to its type-head to cause it to print at the key-actuation, said keys arranged in banks and rows to form the keyboard, certain of said keys printing letters which are likely to be used in sequence being placed toward opposite sides of the keyboard, and the keys printing letters not used in sequence being placed in groups near to each other, a carriage for the typewriter, an escapement for the carriage constructed to feed it a wide or a narrow step at any operation thereof, a case-shift mechanism to enable either character on a type-head to be effective to print, and connections from the case-shift mechanism and keys to the escapement whereby, at the operation of any type-head by its key, the carriage is fed a wide or a narrow step, according to the width of the character to be printed.

5. In a typewriting machine, the combination with an Arabic keyboard including keys for the letter "sin", the letter "shin", the letter "sad", the letter "ye", the letter "ha", a plurality of said letters having their various forms represented by only two forms, viz., by a single terminal form and a single non-terminal form, keys for a plurality of other Arabic letters also being included in said keyboard so that it represents substantially all the commonly-used letters and characters for writing the words of an Arabic language, of type-heads for printing the characters, means connecting each of said keys to its type-head to cause it to print at the key-actuation, the keys being so located in the keyboard that substantially each letter is printed from a key occupying the same relation to the keys printing other letters, irrespective of the terminal or non-terminal character of the letter printed, a carriage for the typewriter, an escapement for the carriage adapted to feed it a wide or a narrow step at any operation thereof, and connections from the keys to the escapement whereby, at the operation of any type-head by its key, the carriage is fed a wide or a narrow step, according to the width of the character to be printed.

6. In a typewriting machine, the combination with an Arabic keyboard including keys for the letter "sin", the letter "shin", the letter "sad", the letter "ye", the letter "ha", a plurality of said letters having their various forms represented by only two forms, viz., by a single terminal form and a single non-terminal form, keys for a plurality of other Arabic letters also being included in said keyboard so that it represents substantially all the commonly-used letters and characters for writing the words of an Arabic language, of type-heads for printing the characters, means connecting each of said keys to its type-head to cause it to print at the key-actuation, the keys being so located in the keyboard that substantially each letter is printed from a key occupying the same relation to the keys printing other letters, irrespective of the terminal or non-terminal character of the letter printed, a carriage for the typewriter, an escapement for the carriage adapted to feed it a wide or a narrow step at any operation thereof, and connections from the keys to the escapement whereby, at the operation of any type-head by its key, the carriage is fed a wide or a narrow step, according to the width of the character to be printed; said keys arranged in banks and rows to form the keyboard, certain of said keys printing letters which are likely to be used in sequence being placed toward opposite sides of the keyboard, and the keys printing letters not used in sequence being placed in groups near to each other.

7. A standard typewriter organized for writing in a language of the Arabic type, comprising a carriage, a keyboard, the keys of which correspond substantially in number and arrangement with those of the standard keyboard of an English-writing typewriter, a set of type-bars bearing Arabic type connected to said keys, said bars bearing upper and lower-case types varying in width, including types of a conventional alphabet having letters by means of which any word of said Arabic language may be legibly written, each of said types printing a complete letter, certain letters of said alphabet being printed by either of two different forms of type-characters, and others by a single form of character, a case-shift mechanism, and means, including both parts that are controlled by certain of said keys acting independently, and also parts that are controlled by certain of said keys acting jointly with said case-shift mechanism, for spacing said carriage from left to right variable distances dependent upon the particular types brought into use.

8. A standard typewriter organized for writing in a language of the Arabic type, comprising a carriage, a keyboard, the keys of which correspond substantially in number and arrangement with those of the standard keyboard of an English-writing typewriter, a set of type-bars bearing Arabic type connected to said keys, said bars bearing upper and lower-case types varying in width, including types of a conventional alphabet having letters by means of which any word of said Arabic language may be legibly written, each of said types printing a complete letter, certain letters of said alphabet being printed by either of two different forms of type characters, comprising a single terminal form and a single non-terminal form, and the others by a single form of character, the relations between said keys and type-bars and the placing of the types on said bars being such that substantially any two characters representative of the same letter may be printed by upper and lower-case types of the same type-bar and therefore capable of being rendered effective by the same key, a case-shift mechanism, and means, including both parts that are controlled by certain of said keys acting independently, and also parts that are controlled by certain of said keys acting jointly with said case-shift mechanism, for spacing said carriage from left to right variable distances dependent upon the particular types brought into use.

9. A standard typewriter for writing in a language, the normal alphabet of which comprises letters represented by characters of different widths, and including letters represented by characters of as many as four different forms, the total number of characters of such alphabet materially exceeding that of the English language, said typewriter comprising, in combination, type-bars bearing types of varying widths, each representative of a complete letter, for printing in a conventional alphabet, and including, for certain letters, types for printing but a single kind of character representative thereof, and, for each of the other letters, types to print two kinds of characters, one representative of a terminal form, and one representative of a non-terminal form, the set of characters represented by said types being capable of being used as substitutes for the set of characters representative of the letters of said normal alphabet, said types being paired on said bars so as to be capable of printing in upper and lower case, those for printing the terminal and non-terminal characters representative of the same letter being paired on the same bar, and in such relation that substantially all terminal characters will be of the same case, a key-board having keys corresponding substantially in number and relative arrangement with those of the standard keyboard of an English-writing typewriter of the case-shift type, a letter-spacing carriage, an escapement mechanism therefor, case-shift mechanism for selectively causing types of upper or lower case to be effective at will, and means controlled by said keys and case-shift mechanism to selectively render said type-bars effective to cause said types to print, and for variably operating said escapement mechanism to letter-space said carriage from left to right at each key operation a distance dependent upon the type to be rendered effective thereby.

10. A typewriting machine to write a cursive Arabic language, comprising, in combination, a carriage, a case-shift mechanism, an escapement to feed the carriage to the right either a narrow or a wide step at any operation thereof, a plurality of type-bars, each having an upper-case wide Arabic character and a lower-case narrow Arabic character, both characters representing the same letter, a single key for each type-bar, and joint controlling connections from the case-shift mechanism and the type-keys to the escapement to vary the extent of the feed of the carriage, whereby at the operation of each type-bar by its key the carriage is automatically fed a narrow or a wide step, according to the width of the lower-case or upper-case type operated by the key.

11. A typewriting machine adapted to write a cursive Arabic language, comprising, in combination, a carriage, a case-shift mechanism, an escapement to feed the carriage to the right either a narrow or a wide step at any operation thereof, a plurality of type-bars each having an upper-case wide Arabic character and a lower-case narrow Arabic character, both characters representing the same letter, a plurality of type-bars each having an Arabic character of identical width in both upper and lower-case representing the same letter, a single key for each type-bar, said keys arranged in banks and rows forming a keyboard, certain of said keys printing letters which are likely to be used in sequence being placed toward opposite sides of the keyboard, and the keys printing letters not used in sequence being placed in groups near to each other, and connections from the case-shift mechanism and the type-keys to the escapement to vary the feed of the carriage, whereby at the operation of each type-bar by its key the carriage is automatically fed a narrow or a wide step, according to the width of the lower-case or upper-case type operated by the key.

12. A typewriting machine adapted to write a cursive Arabic language, comprising, in combination, a carriage, a case-shift mechanism, an escapement adapted to feed the carriage to the right either a narrow or either of two wider steps at any operation thereof, a plurality of type-bars each having a lower-case narrow character and also having an upper-case wider character, a plurality of type-bars each having a lower-case wide character and an upper-case character of the same width, both characters on any type-bar representing the same letter, a single key operating each type-bar, and connections from the case-shift mechanism and the type-keys to the escapement to vary the feed of the carriage, whereby at the operation of each type-bar by its key the carriage is automatically fed one or either of two wider steps, according to the width of the lower-case or upper-case type operated by the key.

SEYED KHALIL.

Witnesses:
ARTHUR A. JOHNSON,
M. E. MERK.